No. 817,965. PATENTED APR. 17, 1906.
E. P. EVERSMANN.
MACHINE FOR MAKING CHENILLE BINDINGS OR TRIMMINGS.
APPLICATION FILED MAR. 1, 1905.
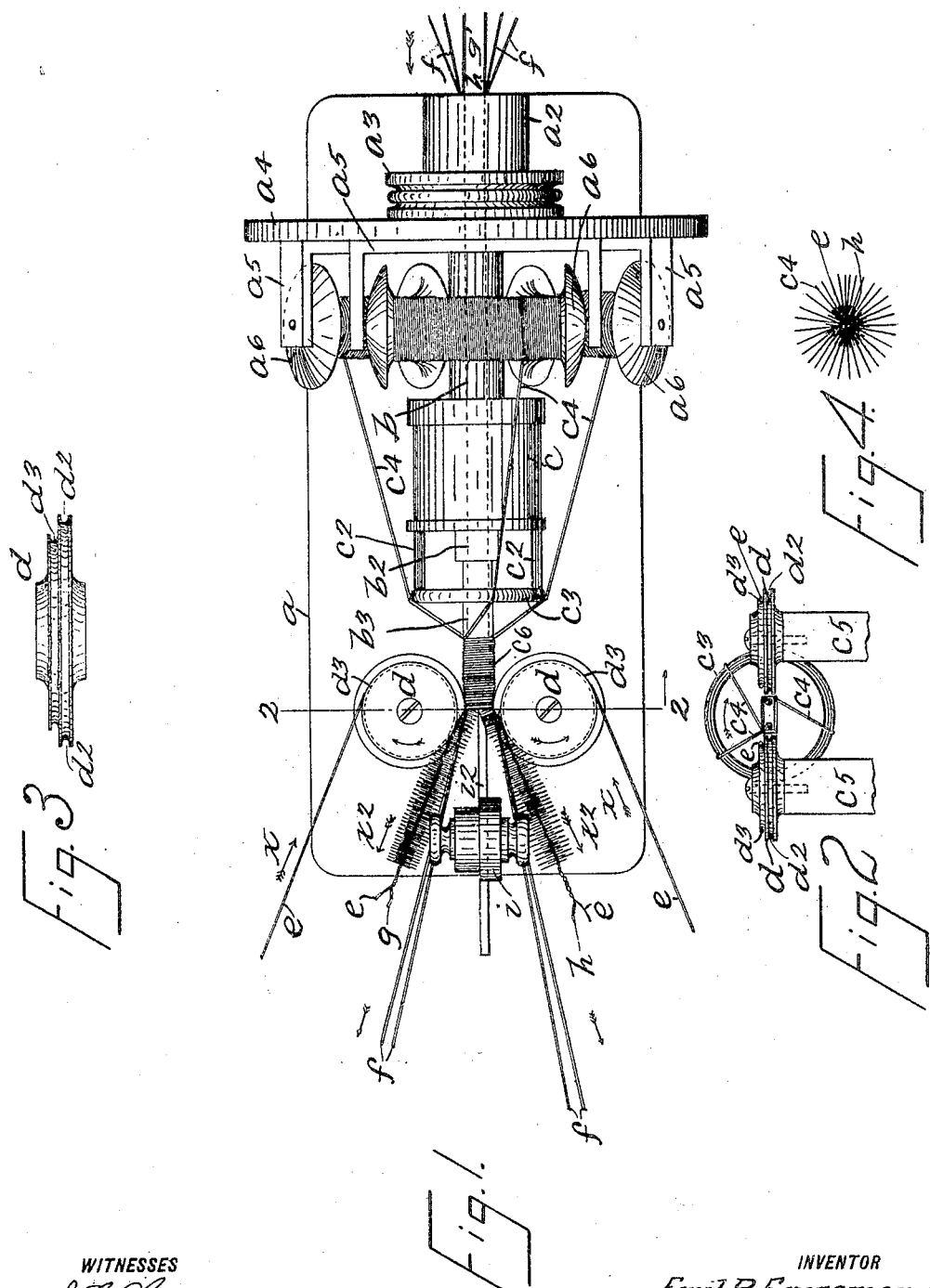
WITNESSES
J. C. Larsen
F. A. Stewart
INVENTOR
Emil P. Eversmann
BY Edgar Seiler & Co
ATTORNEYS

UNITED STATES PATENT OFFICE.

EMIL P. EVERSMANN, OF NEW YORK, N. Y.

MACHINE FOR MAKING CHENILLE BINDINGS OR TRIMMINGS.

No. 817,965.  Specification of Letters Patent.  Patented April 17, 1906.

Application filed March 1, 1905. Serial No. 247,891.

*To all whom it may concern:*

Be it known that I, EMIL P. EVERSMANN, a citizen of the United States, residing at New York, in the county of New York and State of New York, have invented certain new and useful Improvements in Machines for Making Chenille Bindings or Trimmings, of which the following is a specification, such as will enable those skilled in the art to which it appertains to make and use the same.

This invention relates to machines for making chenille binding or trimming for use in making or trimming ladies' garments, hats, and the like; and the object of this invention is to provide improved guide-wheels for the body-threads used in making chenille binding or trimming, whereby the said chenille binding or trimming is provided with two body portions or given what is known as a "caterpillar" effect or appearance.

The invention is fully disclosed in the following specification, of which the accompanying drawings form a part, in which the separate parts of my improvement are designated by suitable reference characters in each of the views, and in which—

Figure 1 is a plan view of what is known as an ordinary chenille-machine, said machine being provided with my improved guide-wheels for the body-threads of the chenille; Fig. 2, a partial section on the line 2 2 of Fig. 1; Fig. 3, a side view of one of the guide-wheels which I employ, and Fig. 4 an end view or cross-section of a piece of chenille made according to my improvement.

In the drawings forming part of this specification I have shown at $a$ the bed-plate or table of an ordinary chenille-machine such as is now used for making chenille or chenille binding or trimming, and this machine is provided at its rear end with an upright $a^2$, which supports a drive-wheel $a^3$, with which is connected a disk $a^4$, having yoke-shaped brackets $a^5$ connected therewith, and in each of which is mounted a spool $a^6$, three of said brackets and spools being employed. Connected with the disk $a^4$ and rotatable therewith is a forwardly-directed tube or tubular shaft $b$, through which is passed a stationary sleeve $b^2$, which is connected with and carried by the arm $a^2$, and a tongue or bar $b^3$ passes through the sleeve $b^2$ and is supported therewith. Connected with the forward end of the tube or tubular shaft $b$ is a drum or similar device $c$, with the front end of which is connected forwardly-directed rods or arms $c^2$, which carry a ring or similar device $c^3$, over which the threads $c^4$, of silk or similar material, which is wound on the spools $a^6$, are passed. At the front end of the tongue or bar $b^3$ and on the opposite sides thereof are standards $c^5$, on which are mounted guide-wheels $d$ for the body-threads of the chenille, and the guide-wheels $d$ form the subject-matter of this invention, all the rest of the construction shown and described being old and well known. The guide-wheels $d$ are also of the same general form as those heretofore employed, said wheels being provided in the edges or faces thereof with the usual grooves $d^2$; but in my improvement the wheels $d$ are provided on their upper sides with raised circular or annular portions of less diameter than the main diameter of said wheels, and in which are formed grooves $d^3$, similar to the grooves $d^2$, and the grooves $d^3$ are arranged concentrically with reference to the grooves $d^2$. Arranged in front of the guide-wheels $d$ is a support $i$, through which is passed a cutter-blade $i^2$, which is so adjusted that the inner end thereof, which is provided with an edge, presses against the coil $c^6$ of silk threads $c^4$ and closely adjacent to the outer end of the tongue or bar $b^3$ and between the guide-wheels $d$.

In the operation of my machine the silk passes from the spools $a^6$ over the ring $c^3$ and is wound on the bar $b^3$, as clearly shown in Fig. 1, while the feed-wires $f$ and the silk threads $g$ and $h$ are drawn forwardly, and the said wires and threads are also being drawn away from each other, thereby exerting pressure on the inner side of the coil of silk (shown at $c^6$,) and drawing the same outwardly in the movement of said feed-wires $f$ until the knife or cutter-blade $i^2$ is reached, which separates the threads from the coils $c^6$ into two equal parts, one of which is drawn toward one of the wheels $d$ and the other of which is drawn toward the other wheel $d$. It will be understood that the threads $e$ and $g$ have been united at the twisting mechanism and are thereby twisted together, and the tension of the twisting is great enough to draw the threads $g$ and $h$ against the groove $d^3$, the twisting of the threads, therefore, beginning in a position closely adjacent to the axial plane of the wheels $d$; but in their outward movement the feed-wires $f$ operate in the grooves $d^2$ of the wheels $d$, and the cut portions of the silk forming the coil $c^6$ are therefore held against the corresponding wheels $d$ for a fraction of a second, depending upon the speed of rotation of the wheels $d$, and the cut portions of silk are held centrally thereof by the said feed-wires; but, the silk threads $g$ and $h$ being drawn outwardly to a greater angle than the feed-wires $f$, the said silk threads are united with the silk threads $e$ at a point removed from the center of the cut portions of silk, and when the twisting of the threads $e\ g$ and $e\ h$ is accomplished in the forward movement thereof the cut portions of silk are held therein, and as the feed-wires $f$ pass away from the corresponding wheels $d$ the cut portions of silk are released thereby; but this releasing of the cut silk occurs at a point slightly remote or beyond the initial point of twisting of the silk threads $e\ g$ and $e\ h$, and the said cut portions of silk are thereby firmly held between the silk threads $e\ g$ and $e\ h$ in the outward movement thereof.

In machines of this class as heretofore constructed the wheels $d$ were provided with but a single annular groove $d^2$ in the edge or face thereof, and the feed-wires $f$ and body threads or wires $e$, $g$, and $h$ all passed through said groove, and the chenille formed by machines constructed in this manner had but a single body portion or the fur thereon was all of the same length; but by separating the body-threads $e$ to a greater extent from the central line of the tongue or bar $b^3$ and from the feed-wires $f$ as they pass through said tongue or bar the short silk threads formed by cutting the coils $c^6$ are caught by the body threads or wires $e$ and $g$ and $h$ and $e$ in such manner that one end thereof is much longer than the other end, as clearly shown in Figs. 1 and 4, and this gives the finished chenille the appearance of having one body portion or what is known as the "caterpillar" effect, and this result is accomplished by forming the supplemental grooves $d^3$ in the wheels $d$ and passing the body-threads $e$ around said grooves.

My invention, as hereinbefore stated, applies only to the guide-wheels $d$, all the other features of the chenille-machine herein shown and described being exactly the same as are now in use, and for this reason the parts of the machine, with the exception of the wheels $d$, are not shown in detail and not more fully described.

Having fully described my invention, what I claim as new, and desire to secure by Letters Patent, is—

1. A machine for making chenille-binding provided with a winding bar or tongue and a cutter mounted in line therewith and adjustable toward and from the end thereof and guide-wheels for the body-threads, said guide-wheels being each provided with parts of different diameters one of which is arranged concentrically with reference to the other and each of said parts being provided with an annular groove, substantially as shown and described.

2. A machine for making chenille-binding provided with a winding bar or tongue and a cutter mounted in line therewith and adjustable toward and from the end thereof, and two guide-wheels mounted on the opposite sides of the end portion of said bar or tongue and provided with parts of different diameters one of which is arranged concentrically with reference to the other and each of said parts being provided with an annular groove, substantially as shown and described.

In testimony that I claim the foregoing as my invention I have signed my name, in presence of the subscribing witnesses, this 28th day of February, 1905.

EMIL P. EVERSMANN.

Witnesses:
    F. A. STEWART,
    C. J. KLEIN.